(12) United States Patent
Lehment et al.

(10) Patent No.: US 11,511,432 B2
(45) Date of Patent: Nov. 29, 2022

(54) ROBOT CONTROL METHOD

(71) Applicant: ABB SCHWEIZ AG, Baden (CH)

(72) Inventors: Nicolas Lehment, Munich (DE);
Andreas Decker, Darmstadt (DE);
Richard Roberts, Gilching (DE);
Bjoern Matthias, Bad Schoenborn
(DE); Jihuan Tian, Shanghai (CN)

(73) Assignee: ABB Schweiz AG, Baden (CH)

( * ) Notice: Subject to any disclaimer, the term of this patent is extended or adjusted under 35 U.S.C. 154(b) by 258 days.

(21) Appl. No.: 16/777,918

(22) Filed: Jan. 31, 2020

(65) Prior Publication Data

US 2020/0164516 A1 May 28, 2020

Related U.S. Application Data

(63) Continuation of application No. PCT/EP2018/070161, filed on Jul. 25, 2018.

(30) Foreign Application Priority Data

Aug. 2, 2017 (EP) .................................... 17184381
Sep. 29, 2017 (EP) .................................... 17194103

(51) Int. Cl.
*B25J 9/16* (2006.01)
*B25J 19/02* (2006.01)

(52) U.S. Cl.
CPC ............. *B25J 9/1676* (2013.01); *B25J 19/02* (2013.01); *B25J 9/1697* (2013.01)

(58) Field of Classification Search
CPC ........ B25J 9/1676; B25J 19/02; B25J 9/1674; B25J 9/1697; F16P 3/142; F16P 3/147; G05B 2219/40202; G05B 2219/40203; G06T 1/0014; G06T 7/0004
See application file for complete search history.

(56) References Cited

U.S. PATENT DOCUMENTS

| 7,778,776 B2 | 8/2010 | Goto et al. | |
| 2008/0021597 A1 | 1/2008 | Merte et al. | |
| 2011/0025547 A1 | 2/2011 | Mohamadi et al. | |
| 2014/0316261 A1 | 10/2014 | Lux et al. | |
| 2015/0061880 A1 | 3/2015 | Rosenstern | |
| 2015/0158178 A1 | 6/2015 | Burmeister et al. | |
| 2018/0033276 A1* | 2/2018 | Whelan | .................. H04W 4/029 |
| 2018/0120804 A1* | 5/2018 | Higuchi | ................... B25J 19/06 |
| 2019/0007659 A1* | 1/2019 | Neubauer | ............... G06T 7/593 |
| 2020/0050839 A1* | 2/2020 | Wolf | ...................... B25J 9/1602 |
| 2020/0206928 A1* | 7/2020 | Denenberg | .............. G01S 17/87 |

FOREIGN PATENT DOCUMENTS

WO WO 2010060475 A1 6/2010

* cited by examiner

*Primary Examiner* — Abby Y Lin
*Assistant Examiner* — Dylan M Katz
(74) *Attorney, Agent, or Firm* — Leydig, Voit & Mayer, Ltd.

(57) ABSTRACT

A method for controlling a robot includes the steps of: deciding whether there is a non-permanent object in a vicinity of the robot; if there is a non-permanent object, deciding whether the object qualifies for extended protection or not; and defining a safety zone around the object which the robot must not enter or in which a maximum allowed speed of the robot is less than outside the safety zone. The safety zone extends to a greater distance from the object if the object qualifies for extended protection than if it does not.

9 Claims, 3 Drawing Sheets

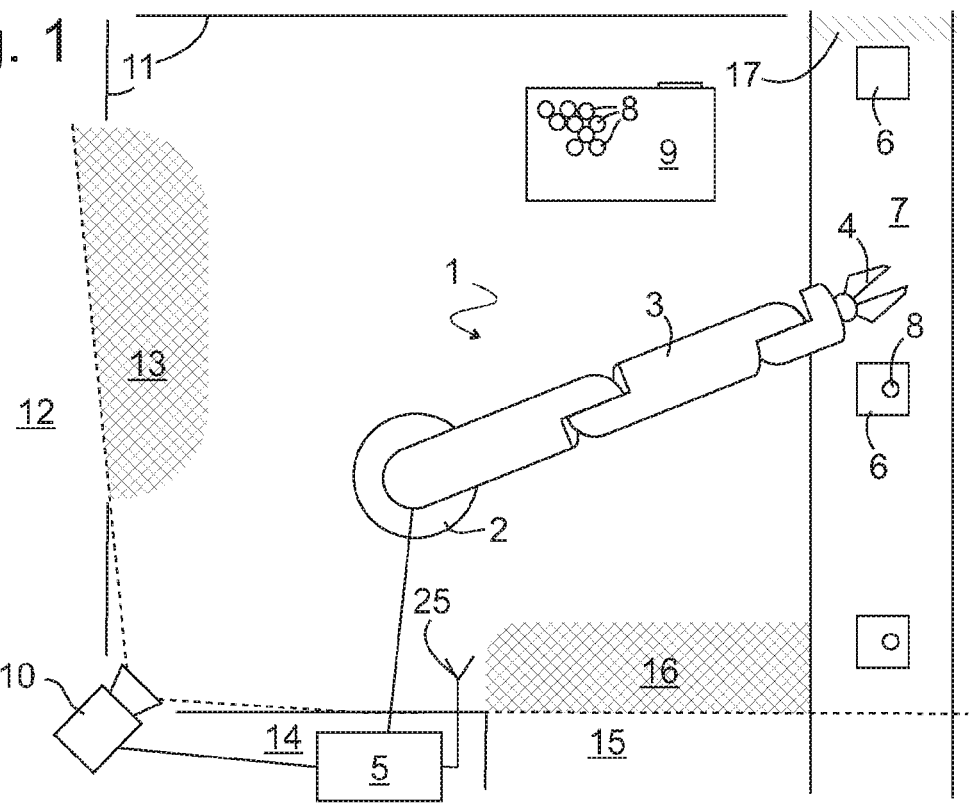
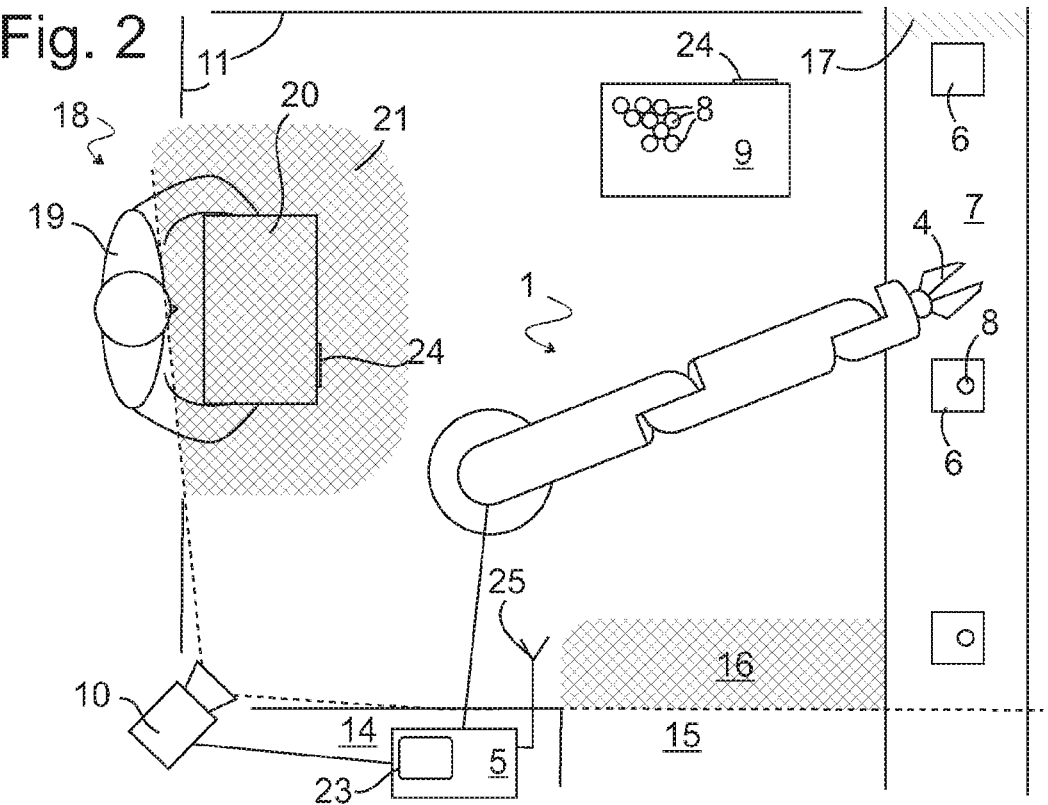

ROBOT CONTROL METHOD

CROSS-REFERENCE TO PRIOR APPLICATION

This application is a continuation of International Patent Application No. PCT/EP2018/070161, filed on Jul. 25, 2018, which claims priority to European Patent Application No. EP 17184381.6, filed on Aug. 2, 2017, and European Patent Applicant No. EP 17194103.2, filed on Sep. 29, 2017. The entire disclosure of the foregoing applications is hereby incorporated by reference herein.

FIELD

The present invention relates to a method for controlling a robot and to a robot system in which the method is used.

BACKGROUND

Wherever robots are used in industry, protecting staff from injury through the robots is a prime concern. Conventionally, enclosures have been built around the robots, equipped with alarms which cause an emergency stop of the robot whenever a person opens the enclosure. Such robots can only accomplish fully automatized, highly repetitive tasks that require no human intervention at all. A direct interaction between robot and human is not possible.

In order to enable robots and humans to cooperate without being separated by an enclosure, more sophisticated security concepts are required. One such concept is known as speed and separation monitoring (SSM), described in ISO/TS 15066:2016—Robots and robotic devices—Collaborative Robots, clause 5.5.4. SSM aims to maintain a certain combination of distance between human and robot and robot motion speed, so as to ensure that the human in the robot work space cannot reach the moving robot. To achieve this, the position of the human must be determined and the robot must adjust its speed and/or trajectory accordingly, maintaining a safe distance from the human.

A sensor having the spatial resolution required for detecting the position of the human, such as a video camera or a radar system, is not per se capable of distinguishing between humans and non-human, in particular inanimate, objects. Motion as such is not a criterion, since any object newly appearing within the detection range of the sensor, can only have got there by moving or by having been moved. However, if any object detected by the sensor is assigned a safe distance which would be appropriate for a human, interaction between robot and human would still be practically impossible since the robot would be unable to touch any object brought into its reach, and the robot might easily be slowed down or even prevented from carrying out a programmed task by an object it cannot pass without violating its safe distance.

SUMMARY

In an embodiment, the present invention provides a method for controlling a robot, comprising the steps of: deciding whether there is a non-permanent object in a vicinity of the robot; if there is a non-permanent object, deciding whether the object qualifies for extended protection or not; and defining a safety zone around the object which the robot must not enter or in which a maximum allowed speed of the robot is less than outside the safety zone, wherein the safety zone extends to a greater distance from the object if the object qualifies for extended protection than if it does not.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic plan view of a robot and its vicinity;
FIG. 2 is a plan view in which an object qualifying for extended protection is entering the vicinity.

DETAILED DESCRIPTION

Figure 3:
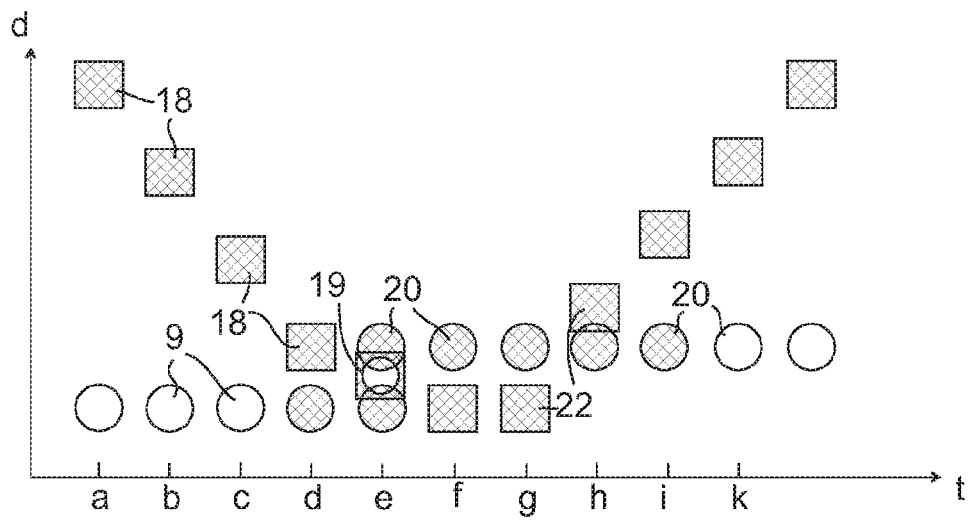
FIG. 3 is a diagram illustrating exemplary changes of the qualification of objects in the vicinity of the robot.

In an embodiment, the present invention provides a method for controlling a robot which ensures the necessary safety for humans in the vicinity of the robot while avoiding unnecessary limitations in the freedom of movement of the robot.

In an embodiment, the present invention provides a method for controlling a robot comprising the steps of:
a) deciding whether there is a non-permanent object in the vicinity of the robot;
b) if there is a non-permanent object, deciding whether the object qualifies for extended protection or not, and
c) defining a safety zone around the object which the robot must not enter or in which a maximum allowed speed of the robot is less than outside said zone, wherein the safety zone extends to a greater distance from said object if it qualifies for extended protection than if it does not;
d) The safety zone is updated in real time and always contains and goes with the object. The safety zone also contains an additional margin surrounding the object, which takes into account the sensor system delay and the maximum speed of the object.

If an object does not qualify for extended protection, the distance to which the safety zone extends may be zero; i.e. the robot may be allowed to touch or even to grip and manipulate the object.

The vicinity can be regarded as equivalent to the detection range of the sensor or of a plurality of sensors on whose outputs the decision of step a) is based.

In principle, an object which qualifies for extended protection should be any human, whereas an object which does not should be inanimate. However, when an object has newly entered the vicinity of the robot, it may not yet be possible to tell whether it is human or not; therefore, when an object is detected to enter the vicinity of the robot, it should initially be judged to qualify for extended protection, notwithstanding that this judgment may be reversed later, when more information on the object has been gathered.

Workpieces also have to be brought into the vicinity in order to be worked upon by the robot. If these were initially judged to qualify for extended protection as mentioned above, the robot would be prevented from touching them and working on them at least until the information has been gathered by which the workpiece can be judged to be inanimate, whereby the work of the robot would be slowed down considerably. In order to avoid unnecessary delays in the operation of the robot, a workpiece entry point should be defined in the vicinity of the robot, so that an object which enters the vicinity by the workpiece entry point can be judged not to qualify for extended protection. In that case, of course, the vicinity of the robot should be designed so that the workpiece entry point is inaccessible to a human from outside the vicinity.

For a first object which was found not to qualify for extended protection (also referred to subsequently as non-qualifying object) the safety distance can be set very low or even zero because the first object can safely be expected not to move unpredictably and possibly hit the robot. Of course such an assumption is no longer valid if the first object is seized by a human. Therefore, if the distance between the first object and a second object becomes less than a predetermined limit, and at least one of the objects has been judged to qualify for extended protection, then the other object is judged to qualify, too.

Such a change in the qualification of the first object causes an abrupt increase of its safety zone, by which the robot may suddenly find itself in the safety zone without having moved. In order to avoid the need for abruptly braking the robot in such a case, it is useful to requalify the first object before the human actually has been able to seize it, i.e. at a time when the distance between the second object (which might be a human) and the first object is not yet less than a pre-set threshold, which is defined as to characterize seizure of the first object by the human, this threshold may be defined as zero or as close to zero.

If it turns out later that the second object has passed by the first object—i.e. the distance between the objects increases again—without the distance actually having become less than the preset threshold, the status of the first object can be reverted to non-qualifying.

If two objects come close enough to each other to become undistinguishable, typically because a human seizes an inanimate object or the human is partly or fully shadowed by the object in the direction of sensor detection, the combined object resulting therefrom should also be judged to qualify for extended protection.

If such an object splits into two or more objects, e.g. because the human puts down a previously seized object, it may be impossible, at least until enough data for a reliable judgment have been gathered, to tell whether one of the two objects is indeed inanimate. Therefore, the qualification for extended protection should be inherited by each of the objects resulting from the split.

The decision that an object is most probably inanimate and does therefore not qualify for extended protection can be based on various criteria.

One criterion is the absence of detectable motion of the object. An advantage of this criterion is that it can be examined, albeit roughly, at no extra cost, using the same spatially resolving sensor as for detection of the object. Reliability of the criterion is considerably improved if a highly sensitive sensor capable of detecting micro-motion due to respiration or heartbeat is used, as described e.g. in US 2011 025547 A1 or US 2014 316261 A1.

As another criterion, it can be judged whether a physical property of the object such as size, shape, weight or surface temperature is incompatible with a human being or not. Judgment of shape and size can also be carried out based on data from the spatially resolving sensor mentioned above. Such a judgment must take account of the fact that a detected object may comprise a human and an inanimate object carried by him, so that an object can be judged not to qualify with certainty if the shape or a dimension of the object is too small for a human to fit in.

For a judgment based on weight or surface temperature, additional sensors become necessary, such as weight-sensitive sensor mats covering the floor of the robot's vicinity, a pyrometer for contact-free temperature measurement, or the like.

Judgment may also be facilitated by the use of specific tags. Objects which are intended to be used in the vicinity of the robot, e.g. workpieces to be worked on by the robot, tools etc. can be provided with tags that are adapted to be read by a sensor of the robot system and which specify the nature of the tagged object. There can be an optical tag, e.g. a QR tag, which can be read by a camera serving as the spatially resolving sensor; an RFID tag has the advantage that it can be read regardless of whether it faces a sensor antenna or not.

The data of the tag should not be used as the sole indicator of the nature of an object; it should be checked whether the data read from the tag fit detectable physical properties of the detected object, in order to find out whether the detected object is only the tagged object or whether it is a combination of the tagged object and another object, which might be a human carrying the tagged object.

Judgement can also be made or inferred from a predefined computer model, for example, CAD or virtual reality model for the already known devices and fixed setup of equipment in the scenery. The computer model, considered as a "digital twin" of the real environment, can be periodically rescanned for an update of environment changes.

If pre-defined criteria do not allow for a certain judgment, the possibility should be provided for an operator to declare whether an object qualifies for extended protection or not.

Further objects of the invention are a robot system comprising a robot, a sensor system for surveilling a vicinity of the robot and a processor unit for controlling the robot based on data from the sensor system using the method as described above, and a computer program product comprising program code means which enable a computer to perform the method.

FIG. 1 is a schematic plan view of an industrial robot 1 and its working environment. In the embodiment shown here, the robot 1 has a stationary base 2, one articulated arm 3 and an end effector 4 at the free end of the arm, but it should be kept in mind that the method which will be described subsequently is also applicable to more complex systems in which the robot is mobile and/or in which it comprises more than one arm and/or more than one end effector.

The motion of the robot 1 is controlled by a processor unit 5, typically a microcomputer, in order to carry out a predefined manufacturing task, for example combining each of a series of first workpieces 6, supplied by a conveyor 7, with a second workpiece 8, taken from a crate 9.

The processor unit 5 may comprise two functionally separate but cooperating processor units: A first processor unit for controlling the robot, and a second processor unit for sensor data evaluation. Both can be within the same electronics rack, but can also be set up apart from each other. Functionally both together make up the processor unit 5.

The processor unit 5 is connected to a spatially resolving sensor 10 which is designed and positioned to monitor the vicinity of the robot 1. In the following the vicinity of the robot 1 and the region in space in which objects can be detected by the sensor 10 will be regarded as identical, assuming that the sensor 10 has been set up appropriately to detect any object that might approach the robot 1 and collide with it, no matter from which direction. In FIG. 1, the sensor 10 is represented as a single camera. In practice it may comprise several cameras viewing the vicinity of the robot 1 from different directions, so that no object can be hidden from all cameras at a time by the robot 1, and so that the processor unit 5 can determine coordinates of an object seen by more than one camera by triangulation.

Of course any other type of sensor capable of providing spatially resolved information on objects in the vicinity of the robot 1 can be used as or combined into the sensor 10, e.g. a radar device, one or more laser or microwave scanners, weight-sensitive tiles on the floor around base 2, etc.

In FIG. 1 the space in which the robot 1 is working is partially confined by walls or barriers 11. Part of these walls or barriers 11 is in the detection range of sensor 10. One of the walls 11 has a passage 12 through which a moving object might at any time enter the vicinity of the robot 1 and collide with it. While a contact between the object and the robot 1 may be desired and should not be prevented, it should be made sure that when such a contact occurs, the robot 1 is at rest and cannot damage the object. Therefore, at all times, the processor unit 5 defines a safety zone 13 which extends from the passage 12 into the vicinity and which it will not allow the robot 1 to enter. The dimension of the safety zone 13 is determined by the condition that whenever an object enters the vicinity through passage 12 with a reasonable speed, e.g. of a quickly walking human, it shall be possible to bring the robot to rest before the object and the robot 1 can touch each other.

The size of the safety zone 13 may vary depending on the instantaneous speed of the robot. The faster the robot 1 moves, the longer is the time needed to bring it to a standstill, and the longer is the distance an intruding object would cover in that time; therefore the width of the safety zone 13 can be adapted to the robot speed.

Further, the direction of the robot movement can be taken into account, making the safety zone 13 larger when the robot 1 is approaching the passage 12, and making it narrower when the robot 1 is moving away from it.

The detection range of the sensor 10 can be limited not only by walls 11 but also by objects such as e.g. an electronics rack 14 accommodating processor unit 5, which might be movable but are usually not moved while the robot 1 is operating. In the plan view of FIG. 1 there is a passage 15 between the rack 14 and the conveyor 7 which is hidden from the sensor 10 and from which a further safety zone 16 defined according to the same criteria as described above for safety zone 12 extends into the vicinity of the robot 1.

While it may be possible for the processor unit 5 to determine the position of the walls 11, the rack 14 and the conveyor 7 from data provided by sensor 10, the passages 12, 15 cannot be detected by the sensor 10. Therefore, when the system of FIG. 1 is set up, the processor unit 5 may be provided with a geometrical model of the vicinity in which all passages by which a human might enter are specified.

The system of FIG. 1 has at least one more passage, 17, namely the one by which first workpieces 6 enter the vicinity. A safety zone assigned to this passage 17 might be a nuisance for operation of the robot 1, since it might have to be considered when controlling the movement of the robot 1 between the crate 9 and the conveyor 7. Therefore, this passage 17 has no safety zone assigned to it. The lack of a safety zone here may be justified pragmatically by the assumption that no human will voluntarily sit on the conveyor and that therefore the possibility that an object qualifying for extended protection might approach the robot 1 through passage 17 can be neglected, or it may be justified technically by blocking access to an upstream portion of the conveyor 7, beyond passage 17, or by making passage 17 too small for a human to pass.

When the system is operating, the sensor 10 will detect any first workpiece 6 that enters the vicinity by passage 17, but as this passage 17 has no safety zone assigned to it, the workpieces 6 are automatically detected as what they are, i.e. as objects which do not have to be protected from contact with the robot but are there to be handled by it.

Things are different if an object 18 enters the vicinity through a passage having a safety zone, as shown in FIG. 2. Here, the object 18 entering the vicinity by passage 12 is a person 19 carrying a crate 20. While the object 18 is not in full view of the sensor 10, the processor unit 5 cannot be certain of the nature of the object 18 and must expect it to move unpredictably. Therefore, as a matter of precaution, it regards the object 18 as qualified for extended protection and therefore defines a safety zone 21 around said object 18 according to the same criteria as described above for safety zone 13. The object 18 will stay surrounded by this safety zone 21 while it moves in the vicinity of the robot 1 and e.g. replaces the old crate 9 by the new one 20, filled with fresh second workpieces 8.

FIG. 3 illustrates how the judgment of the processor unit 5 on the qualification of the various objects 18, 9 in the vicinity evolves in the course of this replacement. At the left-hand side of the diagram, at the beginning of the process (step a), there are two symbols, a square one at a long distanced from the robot 1, representative of the object 18, and a round one, at a small distance, representative of crate 9. The symbol of object 18 is cross-hatched, indicative of its qualification for extended protection; the symbol of crate 9 is empty, since the crate 9 does not qualify, but rather, the workpieces 8 in it are there to be manipulated by the robot 1.

Figure 4:
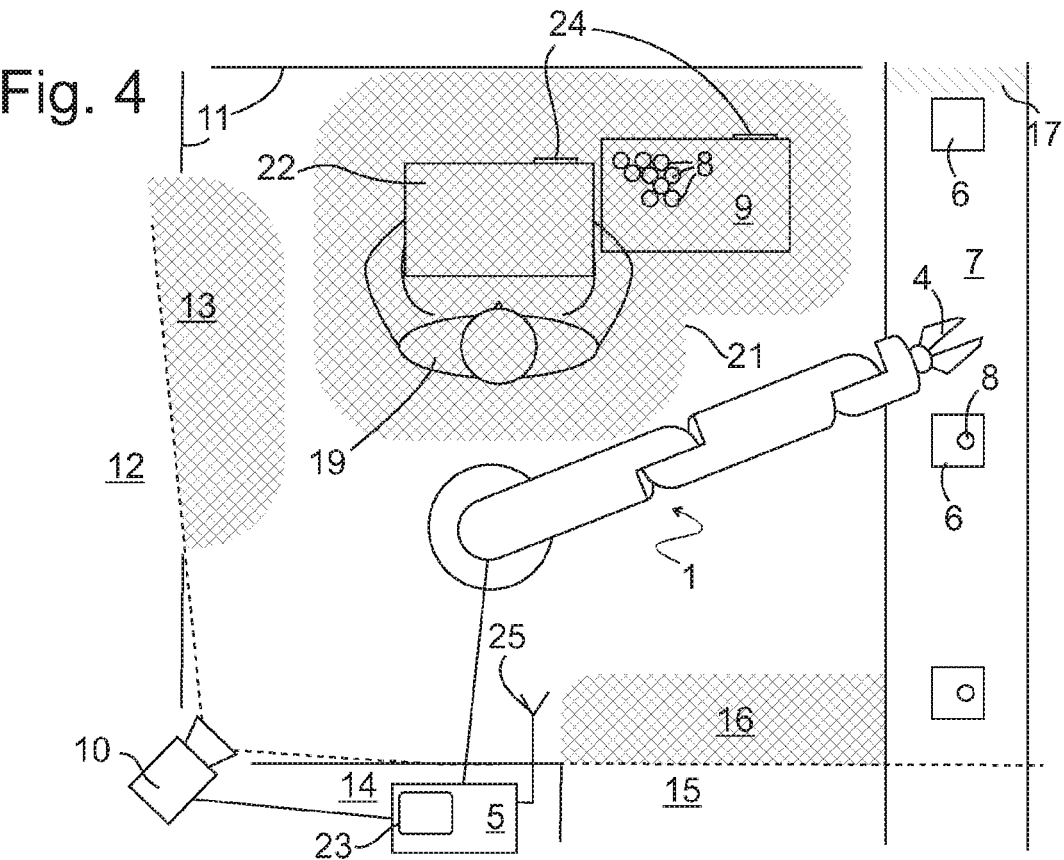
FIG. 4 is another plan view of the robot and its vicinity.

The qualification statuses of object 18 and crate 9 remain unchanged in steps b and c, while the person 19 approaches crate 9. When the distance between both is small enough for the crate 9 to be within an arm's length of the person 19, i.e. if the distance is less than 0.85 m, the processor unit 5 changes the status of the crate 9, indicated by cross-hatching of its symbol in FIG. 3 in step d. Now the safety zone 21 is extended to envelop also crate 9, as shown in FIG. 4. The extended safety zone 21 prevents the robot 1 from fetching a new second workpiece from crate 9.

The person 19 puts down the new crate 20, whereby the crate 20 and the person 19 become distinguishable as two objects by the sensor 10 and the processor unit 5. This is represented by distinct symbols for the crate 20 and for the person 19 appearing in step e.

In step f, the person 19 takes up the old crate 9, represented by a new symbol 22 of a combined object formed of the person 19 and the crate 9, replacing that of crate 9. In the following steps, the combined object 21, i.e. the person 19 and the old crate 9 leave the vicinity, while the new crate 20 stays behind.

If the new crate 19 continued to be protected from contact with the robot 1, the robot 1 couldn't continue work with the new workpieces 8 in crate 20. Therefore, appropriate criteria must be defined which enable the processor unit to decide that an object no longer qualifies for extended protection and to reduce its safety zone.

One possible criterion for such a decision is the absence of motion. If no motion of an object is detected within a predetermined time span, the object can be assumed to be inanimate and therefore not to need a degree of protection which would prevent a contact with the robot 1 even if the object suddenly started to move. The duration of such a time span depends on the precision with which the sensor 10 is capable of detecting motion. If the sensor 10 is sensitive enough to detect micro-motion related to heartbeat or respiration, a duration of some seconds may be sufficient for a reliable judgment.

Judgment might also be based on temperature. If the object to be judged is or comprises a human, then at least part of its surface should emanate infrared radiation. So, if the sensor 10 comprises a pyrometer, and the pyrometer detects no part of the surface of the object with a temperature that might fit a human body, then the object is most likely inanimate and can be judged not to qualify for extended protection.

Another criterion which is easy to evaluate is the weight of the object; if it is noticeably different from that of a human, the object can be judged not to qualify. A disadvantage of this criterion is that the weight cannot be sensed remotely, so that the vicinity of the robot must be equipped at considerable cost with appropriate sensors, such as the weight-sensitive tiles mentioned above.

If the sensor 10 comprises a camera, image processing techniques can be used to extract information on the shape and/or dimensions of the object from the data provided by the camera, and extended protection may be ruled out if these data allow to exclude the presence of a human, e.g. in case of the crate 19, because it is too small for a human to fit in.

There might be the case that an object which a person brings into the vicinity of the robot 1 moves even after the person has left it behind, e.g. a fan. If motion is a criterion which will prevent the processor unit 5 from changing the status of an object to non-qualifying, the fan will always enjoy a wide safety zone around it which may impose severe limits on the mobility of the robot 1 and decrease its productivity. Therefore, the processor unit 5 can have a user interface 23 where a user can inspect the objects which the processor unit 5 has found to qualify for extended protection, e.g. by having them highlighted in an image of the vicinity displayed on a screen, and, if necessary, change the status of an object.

According to a preferred embodiment, the crates 9, 20 carry tags 24 that can be read by the sensor 10 and that specify the nature of the object to which they are attached and/or some of its characteristics. Such a tag can be an optical tag, e.g. a QR tag, which can be read using the camera of sensor 10. Preferably, it is a tag which communicates by radio, such as an RFID tag, a Bluetooth or NFC device, and the processor unit 5 has a radio interface 25 connected to it for communicating with the tags 24. In that case, when the tag 24 enters the range of radio interface 25, the processor unit 5 receives data from the tag 24, from which it can draw conclusions on characteristics detectable by sensor 10, of an object which may be about to enter or may already have entered the vicinity of the robot 1. These data may e.g. specify that the object carrying tag 24 is a crate, its size, and other characteristics. When the object 18, comprising the crate 20 and the person 19 carrying it, enters the vicinity, and the sensor 10 detects the characteristics of this object 18, the processor unit 5 finds that these do not match object 18. Therefore, while the person 19 is moving in the vicinity of the robot 1 carrying the crate, data from the tag 24 will never induce the processor unit 5 to deny extended protection. However, as soon as the crate 20 is put down and becomes detectable as an object of its own, the processor unit 5 will find the data from tag 24 to match this object, so that the crate 20 is found not to qualify for extended protection as soon as the distance between it and the person 19 is long enough, in step k of FIG. 3.

An object which does not qualify for extended protection can still have a safety zone, but the width of the safety zone can be substantially reduced; in case of the crate 20 such a safety zone may prevent the robot from touching the walls of the crate 19 while being small enough to allow the robot to reach in the crate 20 and take out workpieces 8 without violating the safety zone. Alternatively, a non-qualifying object may have no safety zone at all; in that case the robot 1 would be allowed to touch and handle it, e.g. to grab the crate 20 and to pull it from where the person 19 put it to a location closer to the conveyor 7.

Figure 5:
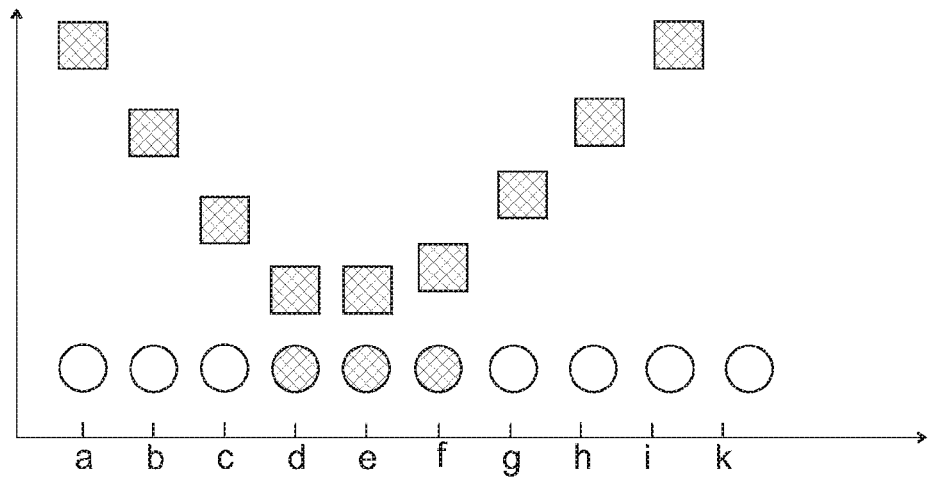
FIG. 5 is another diagram illustrating exemplary changes of the qualification of objects.

The diagram of FIG. 5 relates to a situation in which an object moves through the vicinity of the robot 1 without actually interacting physically with other objects therein, e.g. in which person 19 comes in through passage 12, works on the robot 1 and walks out again. The first steps of the diagram are similar to those of FIG. 3; on his way to the end effector 4 of robot 1, the person 19 passes within an arm's length of crate 9 and thereby makes it qualify for extended protection, too, in step d. However, since the person 19 leaves the vicinity again without touching the crate 9, the status of the crate 9 is reversed to not qualifying in step g. This can be done based on one or a combination of the criteria described above, so that after the person 19 has left, the robot 1 returns to normal operation after a certain delay. Alternatively, if the qualifying status has been conferred to the crate 9 by the person 19 merely coming close, and if no contact between these person and the crate has occurred, so that the two objects have never become undistinguishable, the status of the crate 9 can be returned no non-qualifying as soon as the person 19 starts to move away from it or, at latest, when the distance between the two objects 9, 19 increases above said arm's length or some other appropriately defined threshold, thus minimizing the delay with which normal operation is resumed.

Figure 6:
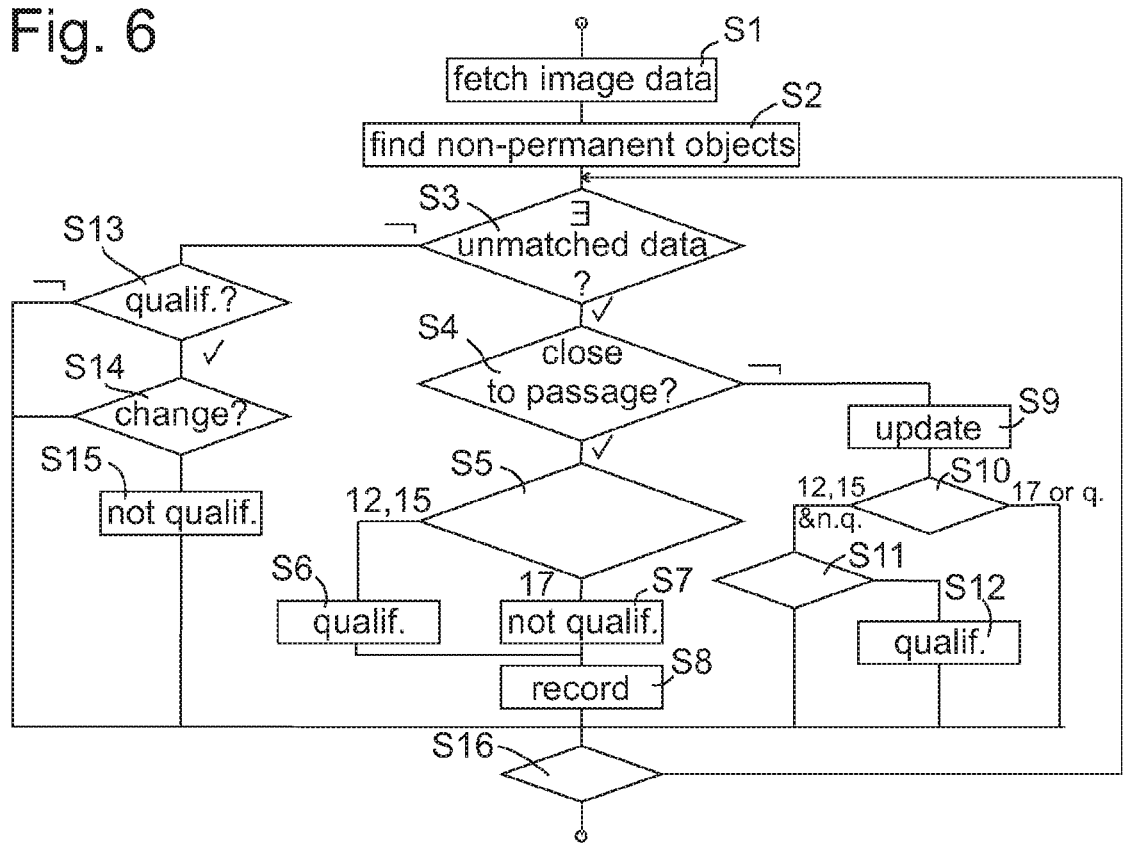
FIG. 6 is a flowchart of a method carried out in a processor unit that controls the robot.

FIG. 6 is a flowchart of a control method of the processor unit 5 which is continuously reiterated in order to achieve the above-described behavior.

In step S1, the processor unit 5 fetches current data on the vicinity of the robot, e.g. an image or, if the sensor 10 comprises multiple cameras, a set of images. Based on a pre-defined geometrical model of the vicinity, it identifies the permanent objects which form this vicinity, such as the walls 11, the conveyor 7, the rack 14, and possibly also the robot 1 itself (S2). Any image details not accounted for by these objects must be related to non-permanent objects. If any of these objects was already present in a previous iteration of the method, data relating to it will have been recorded by the processor unit 5; if a non-permanent object exists which has moved since the previous iteration or which has newly entered the vicinity, it will be detected in step S3 since its position as derived from the current sensor data will not match any of the recorded position data.

If such an object exists and its position is found in step S4 to be closer to a passage 12, 15 or 17 than to any recently recorded position, the object is judged to be new in the vicinity. If the passage was one of the passages 12, 15 that can be passed by a human (S5), the object is possibly human and is therefore judged to qualify for extended protection in step S6; else, if the entry point was passage 17, it is judged not to qualify in step S7. The entry point is included in the object data recorded in step S8.

If in step S4 the object is found to be closer to a previously existing object than to a passage, then the object is regarded as being identical to or being a fragment of said previously existing object, and the protection status and the entry point of said previously existing object are copied to the present object (S9). In this way, while the object 18 of FIG. 2 moves through the vicinity, it is always judged as qualifying for extended protection whereas the workpieces 6 moving on conveyor 7 do not. Due to the possibility of fragmentation, when the person 19 sets down crate 20 in the scenario of FIG. 4 and moves away from it, both become objects of their own and are judged to qualify for extended protection.

Step S10 checks whether the copied status of the object is not qualifying and its entry point is one of passages 12, 15. If both conditions are met, a check is carried out in step S11 whether within an arm's length of the there is another object which does qualify, and if exists, the status of the object is changed to qualifying (12). This is what happened to crate 9 in step d of FIG. 3.

If a current data set is found in step S3 to be identical to a previously recorded one, it must belong to an object which hasn't moved since the previous iteration. If the status of the object is not qualifying (S13), nothing happens to it. Else the processing unit 5 examines (S14), using one or more of the criteria described above, whether the status may be changed, and changes it to non-qualifying (S15) if the criteria are met.

Step S16 checks whether there is an object whose data have not yet been processed, and if there is, the method returns to step S3 to process another set of data; if there isn't, the iteration is finished.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 robot
2 base
3 arm
4 end effector
5 processor unit
6 first workpiece
7 conveyor
8 second workpiece
9 crate
10 sensor
11 wall, barrier
12 passage
13 safety zone
14 rack
15 passage
16 safety zone
17 passage
18 object
19 person
20 crate
21 safety zone
22 combined object
23 user interface
24 tag
25 radio interface

What is claimed is:

1. A method for controlling a robot, comprising the steps of:
deciding whether there is a non-permanent object in a vicinity of the robot;
if there is a non-permanent object, deciding whether the object qualifies for extended protection or not;
defining a safety zone around the object which the robot must not enter or in which a maximum allowed speed of the robot is less than outside the safety zone, and
controlling the robot based on the safety zone,
wherein the safety zone extends to a greater distance from the object if the object qualifies for extended protection than if it does not,
wherein, if a second object has been judged not to qualify for extended protection, re-judging the second object to be qualified for extended protection if the distance between the second object and the object that qualifies for extended protection becomes less than a predetermined limit, wherein the second object is an inanimate object.

2. The method of claim 1, wherein when a third object is detected to enter the vicinity of the robot, the third object is judged to qualify for extended protection.

3. The method of claim 1, wherein the vicinity comprises a workpiece entry point and a third object which enters the vicinity by the workpiece entry point is judged not to qualify for extended protection.

4. The method of claim 1, wherein if the distance between the second object and the object that qualifies for extended protection increases again without having become less than a pre-set threshold, which may be defined as zero or as close to zero, the second object is again judged not to qualify for extended protection.

5. The method of claim 1, wherein if two objects come close enough to each other to become undistinguishable and at least one of the objects has been judged to qualify for extended protection, a resulting object is judged to also qualify for extended protection.

6. The method of claim 1, wherein if a qualifying object splits into two or more objects, each resulting object is also judged to qualify for extended protection.

7. The method of claim 1, wherein an object is judged not to qualify for extended protection if at least one of the following criteria is met:

no motion of the object is detected within a predetermined time span;
at least one detectable physical property of the object comprising at least size, shape, weight, or surface temperature is incompatible with a human being;
the object is equipped with a tag, and data read from the tag fit detectable physical properties of the object;
the object is declared not to qualify for extended protection by an operator.

8. A robot system, comprising:
a robot;
at least one sensor configured to surveil a vicinity of the robot; and
a processor unit configured to control the robot based on data from the at least one sensor using the method of claim 1.

9. A non-transitory computer program product, comprising:
program code configured to enable a computer to perform the method according to claim 1.

* * * * *